(12) United States Patent  (10) Patent No.: US 9,197,974 B1
Clark et al.  (45) Date of Patent: Nov. 24, 2015

(54) DIRECTIONAL AUDIO CAPTURE ADAPTATION BASED ON ALTERNATIVE SENSORY INPUT

(71) Applicants: Brian Clark, San Jose, CA (US);
Ludger Solbach, Mountain View, CA (US)

(72) Inventors: Brian Clark, San Jose, CA (US);
Ludger Solbach, Mountain View, CA (US)

(73) Assignee: Audience, Inc., Mountain View, CA (US)

( * ) Notice: Subject to any disclaimer, the term of this patent is extended or adjusted under 35 U.S.C. 154(b) by 0 days.

(21) Appl. No.: 13/735,446

(22) Filed: Jan. 7, 2013

Related U.S. Application Data

(60) Provisional application No. 61/584,132, filed on Jan. 6, 2012.

(51) Int. Cl.
*H04M 9/08* (2006.01)
*H04R 29/00* (2006.01)
*H04N 5/00* (2011.01)
*H04M 11/00* (2006.01)

(52) U.S. Cl.
CPC .................................. *H04R 29/004* (2013.01)

(58) Field of Classification Search
CPC ............... G06F 1/1626; G06F 1/1686; G06F 2200/1637; G06F 3/011; G06F 3/013; G06F 3/165; H04M 2250/52; H04N 7/142
USPC ........... 348/14.08, 14.16, 135, 241, 607–611; 379/88.01–88.19, 406.01–406.16
See application file for complete search history.

(56) References Cited

U.S. PATENT DOCUMENTS

| | | | |
|---|---|---|---|
| 2003/0099370 A1* | 5/2003 | Moore | 381/312 |
| 2003/0118200 A1* | 6/2003 | Beaucoup et al. | 381/110 |
| 2008/0298571 A1* | 12/2008 | Kurtz et al. | 379/156 |
| 2008/0304677 A1* | 12/2008 | Abolfathi et al. | 381/71.1 |
| 2009/0141908 A1* | 6/2009 | Jeong et al. | 381/92 |
| 2009/0147942 A1* | 6/2009 | Culter | 379/406.06 |
| 2009/0150149 A1* | 6/2009 | Culter et al. | 704/246 |
| 2010/0092007 A1* | 4/2010 | Sun | 381/92 |
| 2010/0215184 A1* | 8/2010 | Buck et al. | 381/66 |
| 2010/0303298 A1* | 12/2010 | Marks et al. | 382/103 |

(Continued)

FOREIGN PATENT DOCUMENTS

| | | |
|---|---|---|
| WO | 2014063099 | 4/2014 |
| WO | 2014063104 | 4/2014 |

OTHER PUBLICATIONS

International Search Report & Written Opinion dated Apr. 29, 2014 in Application No. PCT/US2013/065765, filed Oct. 18, 2013.

*Primary Examiner* — Solomon Bezuayehu
(74) *Attorney, Agent, or Firm* — Carr & Ferrell LLP

(57) ABSTRACT

A system for audio processing of an acoustic signal captured by at least one microphone based on analysis of a video signal associated with the acoustic signal is provided. The video signal may be dynamically processed and analyzed in real time by the system to locate one or more sound sources and to determine distances between the sound sources and the at least one microphone. This information may be used to perform selective noise suppression, noise cancellation, or selective adjustment of acoustic signal components or energy levels acoustic signal components such that noise or unrelated acoustic signal components associated with sound sources not associated with located sound sources are suppressed or filtered. The video signal analysis may track sound source movement for dynamic steering of an acoustic beam towards the sound source.

27 Claims, 9 Drawing Sheets

(56) References Cited

U.S. PATENT DOCUMENTS

| | | | |
|---|---|---|---|
| 2012/0027217 A1* | 2/2012 | Jun et al. | 381/58 |
| 2012/0050582 A1* | 3/2012 | Seshadri et al. | 348/241 |
| 2012/0062729 A1* | 3/2012 | Hart et al. | 348/135 |
| 2012/0133728 A1* | 5/2012 | Lee | 348/14.08 |
| 2012/0249785 A1* | 10/2012 | Sudo et al. | 348/143 |
| 2013/0051543 A1* | 2/2013 | Mcdysan et al. | 379/202.01 |
| 2013/0182857 A1* | 7/2013 | Namba et al. | 381/57 |
| 2013/0332156 A1 | 12/2013 | Tackin et al. | |
| 2014/0112496 A1 | 4/2014 | Murgia et al. | |
| 2014/0114665 A1 | 4/2014 | Murgia | |

* cited by examiner

DIRECTIONAL AUDIO CAPTURE ADAPTATION BASED ON ALTERNATIVE SENSORY INPUT

CROSS REFERENCE TO RELATED APPLICATIONS

This application claims the benefit of U.S. Provisional Application No. 61/584,132 filed Jan. 6, 2012, the disclosure of which is herein incorporated by reference in its entirety.

BACKGROUND

1. Field

The present disclosure relates generally to audio processing, and more particularly to acoustic noise suppression methods based on detecting a sound source.

2. Description of Related Art

Various electronic devices that capture and store video and audio signals may use acoustic noise reduction techniques to provide acoustic signals of higher quality. Noise reduction may improve the audio quality in electronic devices, such as communication devices, mobile telephones, and video cameras, which may convert analog audio to digital audio data streams for transmission over communication networks.

An electronic device receiving an acoustic signal through a microphone can process the acoustic signal in an attempt to distinguish between desired and undesired audio signals. A noise reduction system based on the acoustic signal alone can be misled by or be slow to respond to certain changes in environmental conditions. Furthermore, when a signal receiving electronic device moves with respect to its acoustic source, or vice versa, conventional noise reduction systems may not properly respond to changes in the relative distances between the acoustic source and the microphone of the signal receiving electronic device.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The systems and methods of the present disclosure may provide audio processing of an acoustic signal captured by at least one microphone based on the analysis of a video signal associated with the acoustic signal. More specifically, the video signal may be dynamically processed and analyzed in real time to determine a sound source, its approximate position within an environment, and a distance between the sound source and the at least one microphone. This information may be used to perform selective noise suppression or adjustment of acoustic signal components such that noise or acoustic signals of unrelated sound sources are suppressed or filtered. In addition, the video signal analysis may track motions or other characteristics of the sound source within the environment, which may be used in further applying an acoustic beam steering algorithm to the acoustic signal captured by the at least one microphone.

The video signal processing for determining sound sources may include locating a talker in at least one image of the video signal, performing facial recognition of the talker, detecting lips and their motion, and so forth. For noise sound sources, the video signal processing for determining the sound source may include locating the sound source in at least one image of the video signal, performing detection of the sound source based on movement associated with sound production (e.g., steam hammer, wind mill, barking dog, etc.) or movement of the whole sound producing object (e.g., automobile, airplane, running water, etc.) Moreover, even lacking visible movements associated with sound production by the sound-producing object, the detection and identification of the sound-producing object (e.g., conference room projector producing fan noise, traffic light producing sound signal for the visually impaired, etc.) may help detect, identify and selectively process the associated sound signal. In some embodiments, an approximate location of the sound source (talker or noise source) and an approximate distance between the at least one microphone and the sound source can be determined by processing data provided by an autofocus optical system, visible or infrared light sensors, ultrasonic sensors, proximity sensors, and so forth.

The systems and methods of the present disclosure may be practiced with various electronic devices including, for example, cellular phones, video cameras, and other user devices. Video signals of such devices may be dynamically displayed on a display screen in real time. In addition, the display screen may further display one or more indications of sound sources as determined based on processing of the video signal. When there are more than one sound source, a user may select a particular sound source so that the acoustic signal of the selected sound source is filtered from other acoustic signal components originated by non-selected sound sources.

These and other embodiments are described further below with references to the figures.

DESCRIPTION OF EXAMPLE EMBODIMENTS

Figure 1:
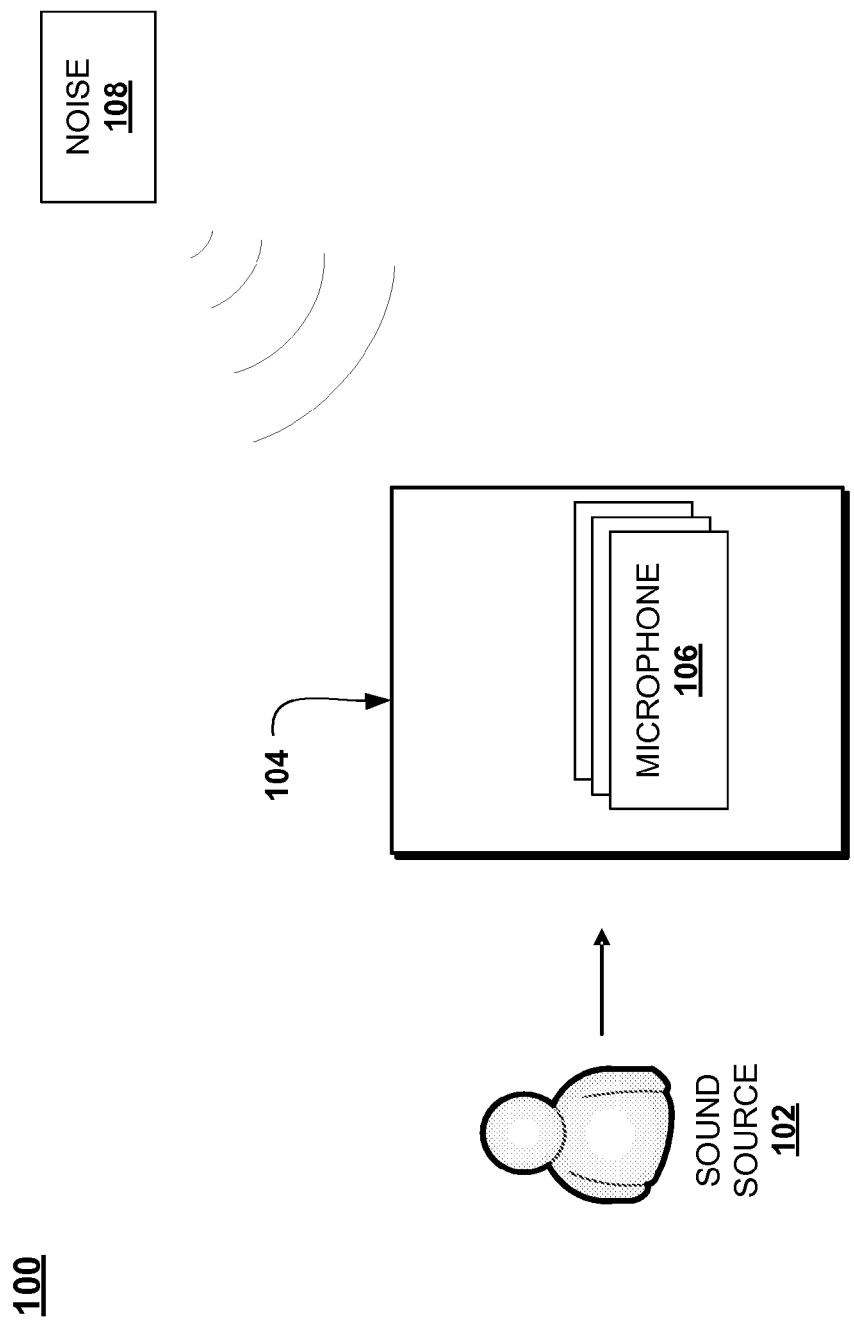
FIG. 1 illustrates an environment in which embodiments of the present technology may be practiced.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer, e.g., a desktop computer, tablet computer, laptop computer, and so forth.

The present technology provides audio processing of an acoustic signal based at least in part on non-acoustic information such as a video signal associated with the acoustical signal or positional data. By analyzing non-acoustic information in addition to acoustic signals, processing of the audio signal and acoustic signal capture process may be significantly improved. The present technology can be applied in single-microphone systems and multi-microphone systems that transform acoustic signals to the frequency domain, to the cochlear domain, or any other domain. The processing based on non-acoustic information allows the present technology to be more robust and provides higher quality audio signals in environments where the system or any acoustic sources can be moved during use.

Audio processing as performed in the context of the present disclosure may be used in noise reduction systems, including noise cancellation and noise suppression. A brief description of noise cancellation systems and noise suppression systems is provided below. Note that the audio processing systems discussed herein may use both systems or just one of them.

Noise reduction may be implemented by subtractive noise cancellation or multiplicative noise suppression. Noise cancellation may be based on null processing, which involves cancelling an undesired component in an acoustic signal by attenuating audio from a specific direction, while simultaneously preserving a desired component in an acoustic signal, e.g. from a target location such as a main talker. Noise suppression may use gain masks multiplied against a sub-band acoustic signal to suppress the energy levels of noise (i.e. undesired) components in the sub-band signals. Both types of noise reduction systems may benefit from implementing the present technology.

Non-acoustic information may be used to determine one or more audio processing system parameters. Examples of system parameters that may be modified based on non-acoustic information are gain (e.g., PreGain Amplifier (PGA) control parameters and Digital Gain control of primary and secondary microphones), inter-level difference (ILD) equalization, directionality coefficients (for null processing), and thresholds or other factors that control the classification of echo vs. noise and noise vs. speech.

Non-acoustic information, in general, may include a video signal captured by a video camera or positional information captured by an autofocus optical system, a visible light sensor, an infrared light sensor, ultrasonic sensor, a proximity sensor, and so forth. If a video signal of an environment having one or more sound sources is received from the video camera in addition to the associated acoustic signal captured by one or more microphones, the video signal may be processed to determine at least one sound source within the environment and its relative position with respect to the microphones. The relative position information may be then used to apply an acoustic beam steering algorithm to the acoustic signal captured by the one or more microphones to steer the acoustic beam towards the at least one sound source.

In addition, or alternatively, the relative position information may be used to perform noise cancellation, noise suppression, adjustment of energy levels of acoustic signal components, or any other audio processing to improve the quality of the acoustic signal.

The video signal may be also presented on a display screen in real time. The display screen may also overlay indication of the at least one sound source determined. For example, if a talker is a sound source as determined based on processing of a video signal, a corresponding indication of the talker may be overlaid onto the display screen. If there are multiple talkers, the user may be prompted to select one of the talkers for further suppression of sounds originating from other non-selected sound sources.

If the electronic device receives positional information of at least one sound source captured by, for example, an autofocus optical system, along with an acoustic signal associated therewith, the positional information may be used to perform noise suppression or noise cancellation, and other similar procedures. It should also be noted that the video signal and the positional information associated with captured acoustic signal may be used to perform processing of the acoustic signal as described herein.

An audio processing system using positional information, for example, to separate multiple sound sources, may be susceptible to a change in the relative position of the electronic device that includes the audio processing system. For those skilled in the art it would be clear that decreasing this susceptibility might result in increasing the positional robustness. The operating assumptions and parameters of the underlying algorithm that are implemented by an audio processing system may need to be changed according to the new relative position of the communication device that incorporates the audio processing system. Analyzing only acoustic signals may lead to ambiguity about the current operating conditions or slow response to a change in the current operating conditions of an audio processing system. Incorporating information from one or more non-acoustic information sources according to embodiments of the present invention may remove some or all of the ambiguity and/or improve response time and, therefore, improve the effectiveness and/or quality of the system.

FIG. 1 illustrates an environment 100 in which embodiments of the present technology may be practiced. FIG. 1 includes a sound source 102, example electronic device 104, and a noise source 108. The sound source 102 may include a user speaking in a vicinity of the electronic device 104. The electronic device 104 may include a communication device, wireless telephone, a computing device, a gaming console, a multimedia device, a video camera, or any similar electronic device capable of capturing and processing acoustic and other signals.

Audio from the user or talker may be referred to as main speech. The example electronic device 104 as illustrated in FIG. 1 may include one or more microphones 106, such as a primary microphone and a secondary microphone located a distance away from the primary microphone. In other embodiments, the electronic device 104 may include one or more microphones 106, such as, for example, three, four, five, six, seven, eight, nine, ten or even more microphones.

The one or more microphones 106 may be omni-directional microphones or directional microphones. Alternatively, embodiments may utilize other forms of microphones or acoustic sensors/transducers. While the microphones 106 may receive and transduce sound (i.e. an acoustic signal) from the sound source 102, the microphones 106 may also pick up noise 108. Although noise 108 is shown coming from a single location in FIG. 1, it may comprise any undesired sounds from one or more locations different from sound source 102, and may include sounds produced by a loudspeaker associated with device 104, and may also include reverberations and echoes. Noise 108 may be stationary, non-stationary, and/or a combination of both stationary and non-stationary. Echo resulting from a faraway talker is typically non-stationary.

Some embodiments may utilize level differences (e.g. energy differences) between the acoustic signals received by the one or more microphones 106. Because one of the microphones 106 may be closer to the sound source 102 than another microphone, the intensity level may be higher for the first microphone, resulting in a higher energy level received by such first microphone, when the main speech is active, for example. The inter-level difference (ILD) may be used to distinguish between speech and noise. An audio processing system may use a combination of energy level differences and time delays to identify speech components. Additionally, an audio processing system may use phase differences between signals coming from different microphones to distinguish noise from speech, or distinguish one noise source from another noise source. Based on analysis of such inter-microphone differences, which can be referred to as binaural cues, speech signal extraction or speech enhancement may be performed.

Figure 2:
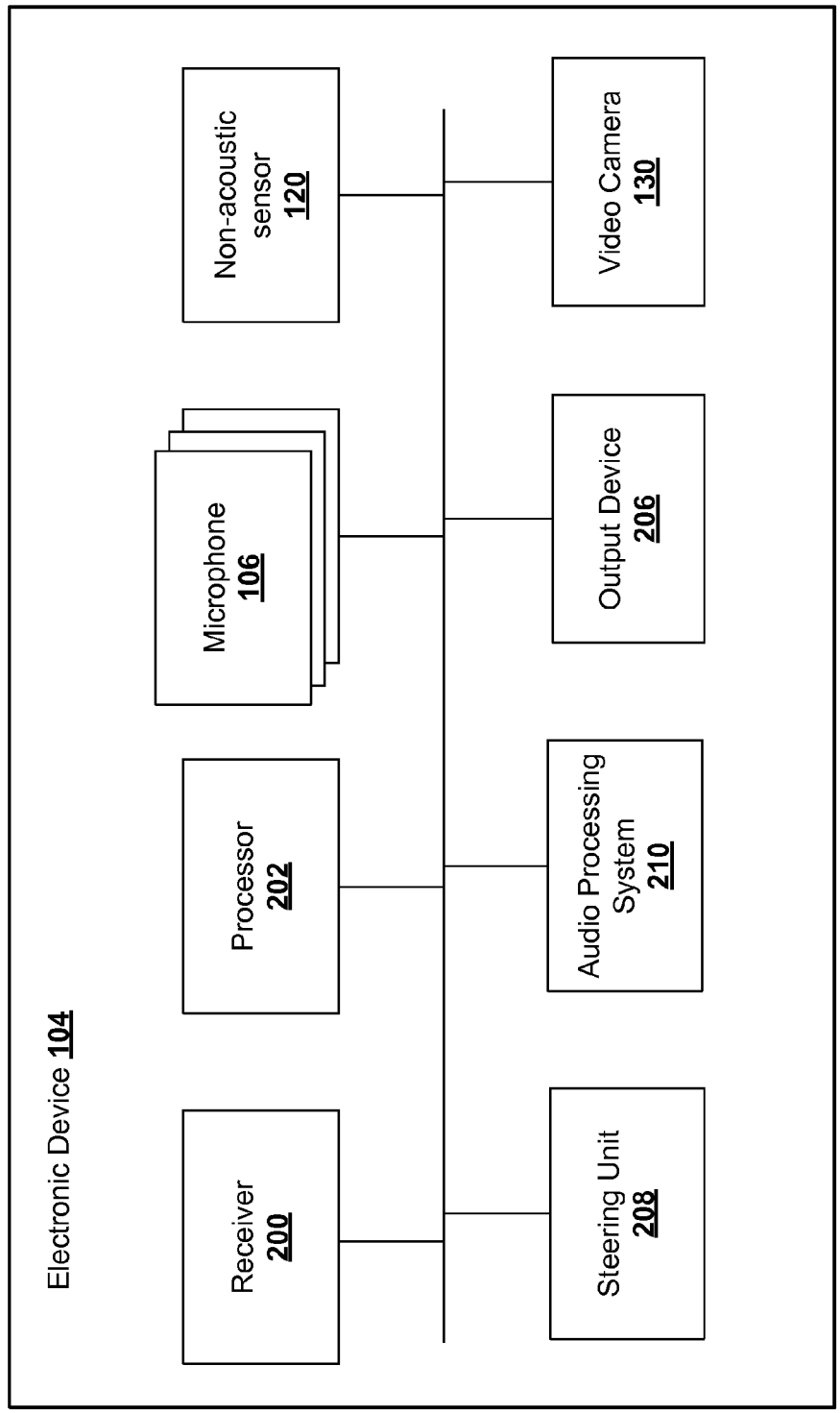
FIG. 2 is a block diagram of an example electronic device.

FIG. 2 is a block diagram of an example electronic device 104. In example embodiments, the electronic device 104 (also shown in FIG. 1) is an audio receiving device that includes a receiver 200, a processor 202, one or more microphones 106, a steering unit 208, an audio processing system 210, an optional non-acoustic sensor 120, an optional video camera 130, and an output device 206. In operation, the electronic device 104 may comprise additional or different components. Similarly, electronic device 104 may comprise fewer components that perform functions similar or equivalent to those depicted in FIG. 2. Additional details concerning components shown in FIG. 2 are provided below.

Still referring to FIG. 2, the processor 202 may include hardware and/or software, which may execute computer programs stored in a memory (not shown in FIG. 2). The processor 202 may use floating point operations, complex operations, and other operations. The example receiver 200 may be configured to receive a signal from a communications network. In some embodiments, the receiver 200 may include an antenna device (not shown) for communicating with a wireless communication network, such as for example, a cellular communication network. The signals received by receiver 200 and the one or more microphones 106 may be processed by the audio processing system 210 and provided as output by the output device 206. For example, the audio processing system 210 may implement noise reduction or cancellation techniques on the received signals. The present technology may be used in transmitting and receiving paths of a communication device.

The electronic device 104 may also include at least one steering unit 208 configured to track a specific talker or a sound source based upon audio characteristics of the sound source. In some embodiments, visual or other characteristics, examples described further herein, may be used. The steering unit 208 may utilize an acoustic beam steering algorithm to track the specific talker. This may allow enhancing the voice of the talker or the sound source independently of their locations. A location of the selected sound source may be automatically identified and the acoustic beam may be steered to dynamically track the sound source as the location of the sound source changes.

According to one embodiment, the steering unit 208 may be configured to control orientation of the one or more microphones 106. The steering unit 208 may include a physical unit configured to rotate the one or more microphones 106 about an axis, or it may be a virtual unit configured to selectively capture acoustic signal from a plurality of microphones 106 placed in a row. Both embodiments are described below with reference to FIGS. 3 and 4.

Still referring to FIG. 2, the optional non-acoustic sensor 120 may measure a spatial position or steer an acoustic beam relative to the spatial position of a sound source, such as the mouth of a main talker (a.k.a the "Mouth Reference Point" or MRP). The optional non-acoustic sensor 120 may also measure a distance between the one or more microphones 106 (or electronic device 104) and a sound source. The optional non-acoustic sensor 120 may also measure relative position of the one or more microphones 106 (or electronic device 104) and a sound source. In either case, the optional non-acoustic sensor 120 generates positional information, which may be then provided to the processor 202 or stored in a memory (not shown). As the acoustic beam is steered relative to a sound source, processing of the audio signal may be modified accordingly. Generally, the optional non-acoustic sensor 120 may include an autofocus optical system, a motion sensor, a visible light sensor, an infrared light sensor, a proximity sensor, an ultrasonic sensor, an accelerometer, a gyroscope, and so forth. Alternatively, an embodiment of the present technology may combine positional information of multiple non-acoustic sensors to determine when and how to modify the acoustic signal, or modify and/or select any system parameter of the audio processing system. In certain embodiments, the non-acoustic sensor 120 may be connected to the electronic device 104 such that positional information is received from the receiver 200 for further processing by the processor 202.

The video camera 130 may be configured to capture still or motion images of an environment, from which the acoustic signal is captured. The images captured by the video camera 130 may include pictures taken within the visible light spectrum or within a non-visible light spectrum such as the infrared light spectrum (a.k.a. "thermal vision" images). The video camera 130 may generate a video signal of the environment, which may include one or more sound sources (e.g., talkers) and optionally one or more noise sources (e.g., other talkers and operating machines). The video signal may be transmitted to the processor 202 for further storing in a memory (not shown) or processing to determine relative position of one or more sound sources. In an example embodiment, the processor 202 may perform facial recognition process to locate one or more talkers within the environment, locate the lips of the talkers and determine movement of the lips, and so forth. The facial recognition may also include locating eyes, determining a distance between eyes, locating the nose or nose tip, locating the mouth, ears, determining blinking of the eyes of the talkers, determining time of the day, determining talker emotions, and so forth. The facial recognition process may include use of machine learning algorithms such as neural network algorithms or similar methods.

Once the processor 202 determines the presence of one or more talker by processing the video signal as discussed above, the processor 202 may derive, in real time, positional information associated with the talkers, relative positional information associated with the talkers, or distances and directions from the video camera 130 to the talkers. This positional information including distances and directions towards the talkers may then be used for noise suppression, noise cancellation, adjustment of acoustic signal components, or for operating the steering unit 208 to dynamically steer an acoustic beam towards the talker(s). In certain embodiments, the positional information may be used to suppress noise or acoustic signal components originating from the area of the environment being not associated with the located talker. For noise sound sources, for example, the video signal processing for determining the sound source may include locating the sound source in at least one image of the video signal, performing detection of the sound source based on movement associated with sound production (e.g., steam hammer, wind mill, barking dog, etc.) or movement of the whole sound producing object (e.g., automobile, airplane, running water, etc.) Moreover, even lacking visible movements associated with sound production by the sound-producing object, the detection and identification of the sound-producing object (e.g., conference room projector producing fan noise, traffic light producing sound signal for the visually impaired, etc.) may help detect, identify and selectively process the associated sound signal. In some embodiments, an approximate location of the sound source (talker or noise source) and an approximate distance between the at least one microphone and the sound source can be determined by processing data provided by an autofocus optical system, visible or infrared light sensors, ultrasonic sensors, proximity sensors, and so forth. As will be discussed in more detail below, when there are multiple sound sources, the user of the electronic device 104 may select one of the sound sources (e.g., a specific talker) to track its movement and dynamically capture audio data of the selected sound source only.

The information related to the motion of the lips may be further used by the processor 202 to estimate noise and perform acoustic signal processing. In certain embodiments, the processor 202 may determine specific motion of the lips and/or distances of the lips. This information may be utilized to perform phoneme classification, determining sound level, direction of acoustic signal propagation, and so forth. This data may be further used to perform noise suppression, noise cancellation, adjustment of acoustic signal components, and so forth.

In certain embodiments, the information related to the motion of the lips may be used as a reliable detector of an active talker. Accordingly, the processor 202 may automatically determine active talkers (also referred herein to as talkers) and dynamically suppress energy levels of those acoustic signal components that are not currently associated with the active talker.

In certain additional embodiments, the information related to the movement of lips may be used for resynthesizing parts of obscured speech. More specifically, video analysis of the motion of lips may provide a phoneme classification that may be used for adjustment of the acoustic signal components with prerecorded or synthetized acoustic components completing "gaps" or parts of obscured speech.

It should also be mentioned that the video camera 130 may be externally coupled to the electronic device 104 via the receiver 200. In this case, a video signal may be received by the receiver 200 and forwarded to the processor 202 for processing. In addition, it should be clear that the present technology may be practiced with multiple video cameras 130 coupled externally and/or internally to the electronic device 104.

Still referring to FIG. 2, the audio processing engine 210 may be configured to receive acoustic signals from an acoustic source via the one or more microphones 106 and process the acoustic signals' components. The microphones 106 (if multiple microphones 106 are utilized) may be spaced a distance apart such that acoustic waves impinging on the device from certain directions exhibit different energy levels at the two or more microphones. After reception by the microphones 106, the acoustic signals may be converted into electric signals. These electric signals may themselves be converted by an analog-to-digital converter (not shown) into digital signals for processing in accordance with some embodiments.

In various embodiments, where the microphones 106 are omni-directional microphones that are closely spaced (e.g., 1-2 cm apart), a beamforming technique may be used to simulate a forward-facing and a backward-facing directional microphone response. A level difference may be obtained using the simulated forward-facing and the backward-facing directional microphone. The level difference may be used to discriminate speech and noise in e.g. the time-frequency domain, which can be used in noise and/or echo reduction. In other embodiments, the microphones 106 are directional microphones, which may be arranged in rows and oriented in various directions. In certain embodiments, the microphones 106 may be provided with the steering unit 208 to adjust a gain between acoustic signals originating from different directions.

Still referring to FIG. 2, the output device may be any device that provides an audio and/or video output to a user. For example, the output device 206 may comprise a speaker, an earpiece of a headset, or a handset associated with communication device 104. In some embodiments, the acoustic signals from output device 206 may be included as part of the acoustic signal recorded by microphones 106. This may cause echoes, which are generally undesirable. The acoustic signal may be processed by the audio processing system 210 to produce a signal with an improved audio quality for transmission across a communication network and/or routing to output device 206. The present technology may be used, for example, in the audio processing system 210, to improve the audio quality of the primary and secondary acoustic signal.

According to various embodiments, the output device 206 may also comprise computer readable storage media which may include one or more of a hard disk, floppy disk, a flexible disk, magnetic tape, any other magnetic storage medium, a CD-ROM disk, digital video disk (DVD), BLU-RAY DISC (BD), any other optical storage medium, RAM, PROM, EPROM, EEPROM, FLASH memory, and/or any other memory chip, module, or cartridge. The output device 206 may also include in some embodiments a display, a monitor, a television device or similar visualizing device. The display may be used to present a video signal captured by one or more video cameras 130. In certain embodiments, the display may provide a graphical user interface (GUI) to facilitate making selections by the user. Furthermore, the GUI may present indications of sound sources and their parameters including distances as determined by the processor 202.

Some or all of the above-described modules in FIG. 2 may be comprised of instructions that are stored on a non-transitory storage medium. The instructions can be retrieved and executed by the processor 202. Some examples of instructions include software, program code, and firmware. Some examples of storage media comprise memory devices and integrated circuits. The instructions are operational when executed by the processor 202 in accordance with embodiments of the present disclosure. Those skilled in the art are familiar with instructions, processor(s), and (computer readable) storage media.

Figure 3:
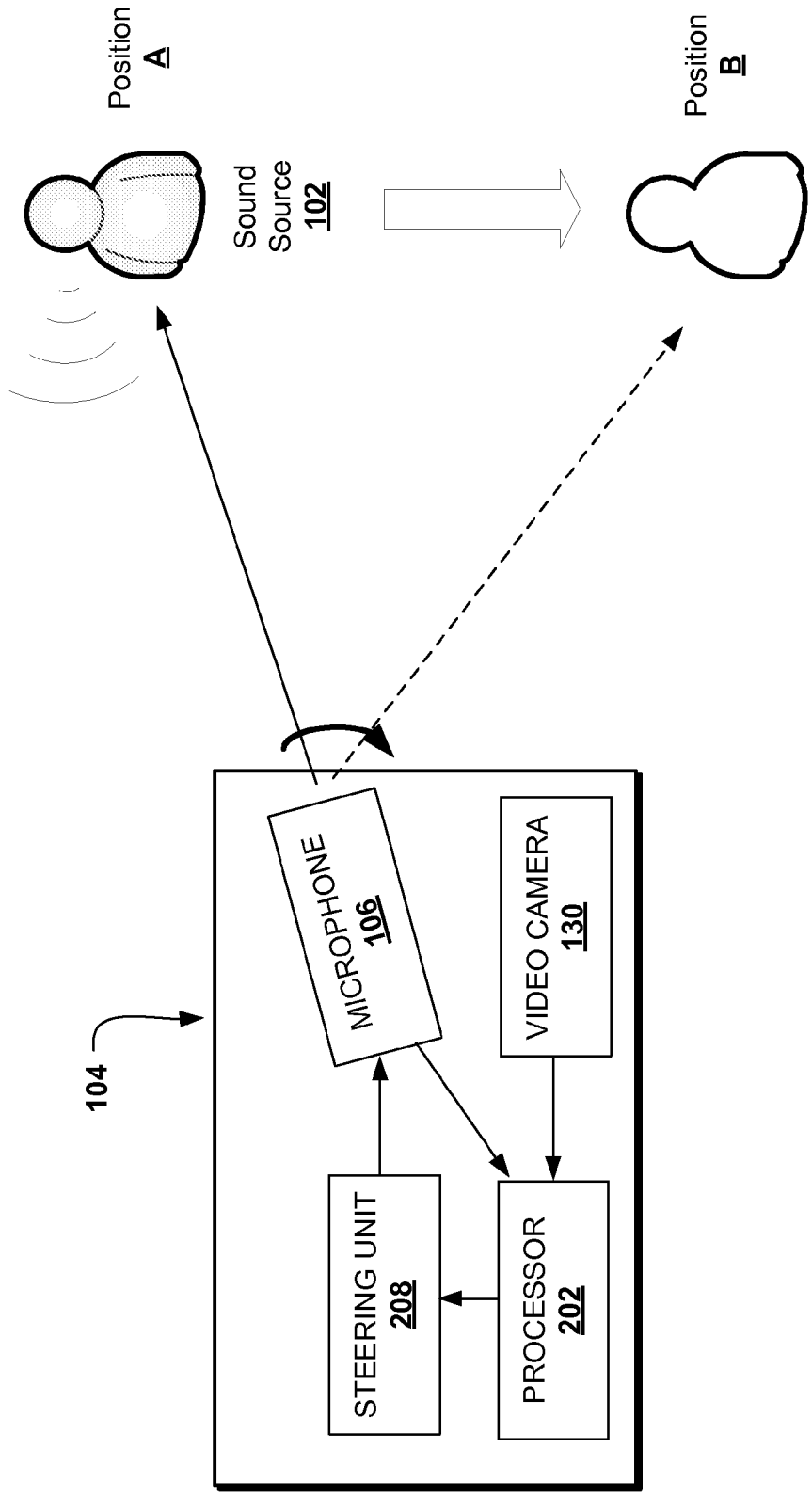
FIG. 3 is a block diagram of another example environment in which embodiments of the present technology may be practiced.

FIG. 3 is a block diagram of an example environment 300 in which embodiments of the present technology may be practiced. As shown in FIG. 3, the electronic device 104 may include a microphone 106, a steering unit 208, a video camera 130, and a processor 202. The electronic device 104 may have additional or other components as discussed above with reference to FIG. 2.

The video camera 130 may acquire a video signal of the environment 300 having a sound source 102 (i.e. a talker), which is located in "Position A". The video signal may be processed by the processor 202 such that a relative position of the sound source 102 may become apparent for the electronic device 104. The processor 202 may then control the steering unit 208, based on the relative position data, to dynamically track the sound source 102 as the location of the sound source 102 changes. Microphone 106 may be an omni-directional microphone, and for omni-directional microphones the steering unit 208 may perform a specific beamforming technique to simulate a forward-facing and a backward-facing directional microphone response.

The video camera 130 may acquire the video signal repeatedly and the processor 202 may process it in real time. Accordingly, the electronic device 104 may track relative position of the acoustic source within the environment 300 in real time.

In one example embodiment, the orientation of the microphone 106 may be also controlled in real time such that the microphone 106 is constantly oriented towards the sound source 102. For example, when the sound source 102 is moved form the "Position A" to "Position B", the electronic device 104 may track the sound source 102 and orient the microphone 106 towards the current position of the sound source 102.

Figure 4:
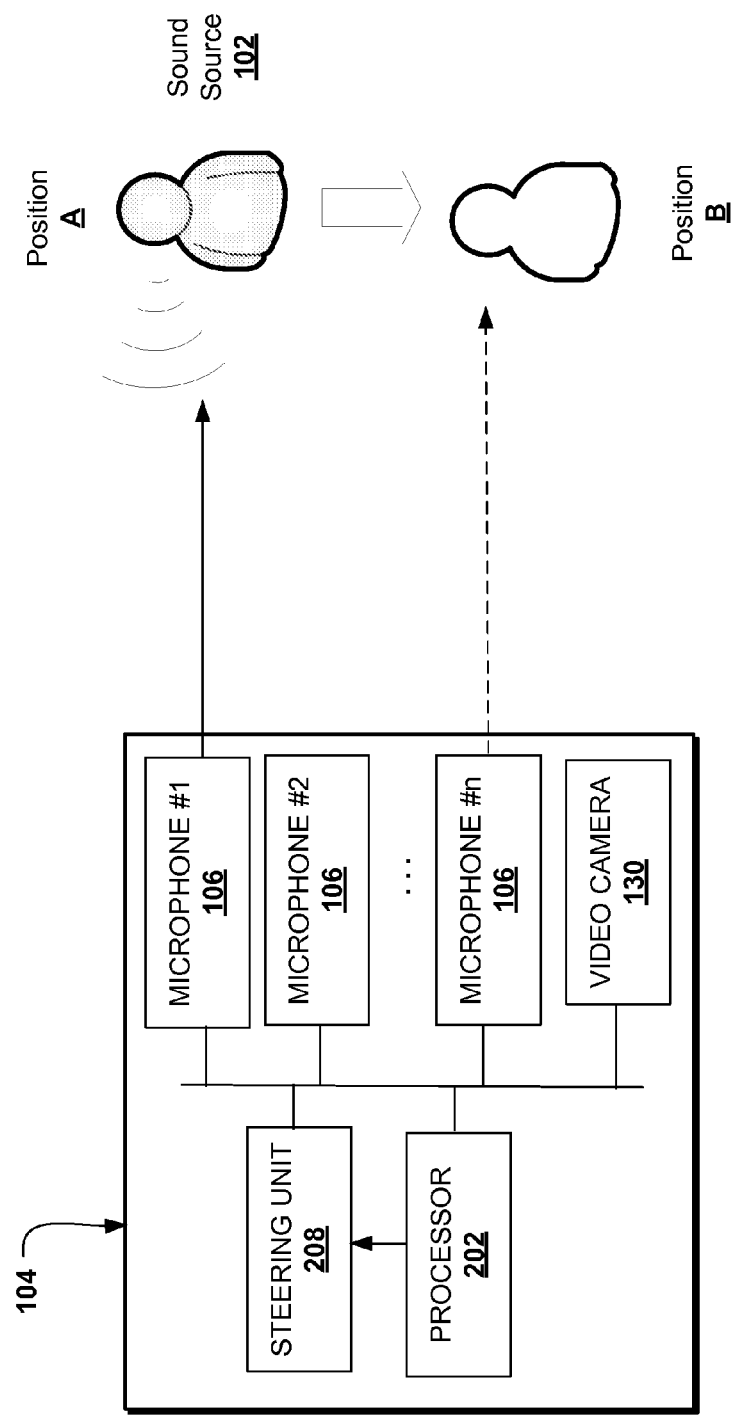
FIG. 4 is a block diagram of yet another example environment in which embodiments of the present technology may be practiced.

FIG. 4 is another block diagram of an example environment 400 in which embodiments of the present technology may be practiced. As shown in FIG. 4, this embodiment is similar to the embodiment shown in FIG. 3, however in this case, the electronic device 104 is provided with a plurality of microphones 106 #1 . . . #n, each having a certain orientation towards the environment 400.

Similarly, once the video camera 130 captures a video signal, the processor 202 may process the video signal and determine relative position information with respect to a sound source 102. Furthermore, the processor 202 may instruct the steering unit 208 to select one of the microphones 106 #1 . . . #n, which is the most suitable for capturing an acoustic signal from the current position of the sound source. Once the sound source 102 is moved from "Position A" to "Position B", the processor 202 may virtually and dynamically select (i.e. enable/disable) corresponding microphones 106 #1 . . . #n to capture the acoustic signal in the best available quality. In certain embodiments, the processor 202 may enable, via the virtual steering unit 208, two or more microphones 106 #1 . . . #n simultaneously.

It should also be mentioned that the microphones 106 #1 . . . #n may be omni-directional microphones, and for omni-directional microphones the steering unit 208 may perform a specific beamforming technique to simulate a forward-facing and a backward-facing directional microphone response. Furthermore, it should be understood that the examples illustrated in FIGS. 3 and 4, may be practiced without the use of the video camera 130, but instead by utilizing non-acoustic sensor(s) 120 for acquiring positional information of the sound source 102.

Figure 5:
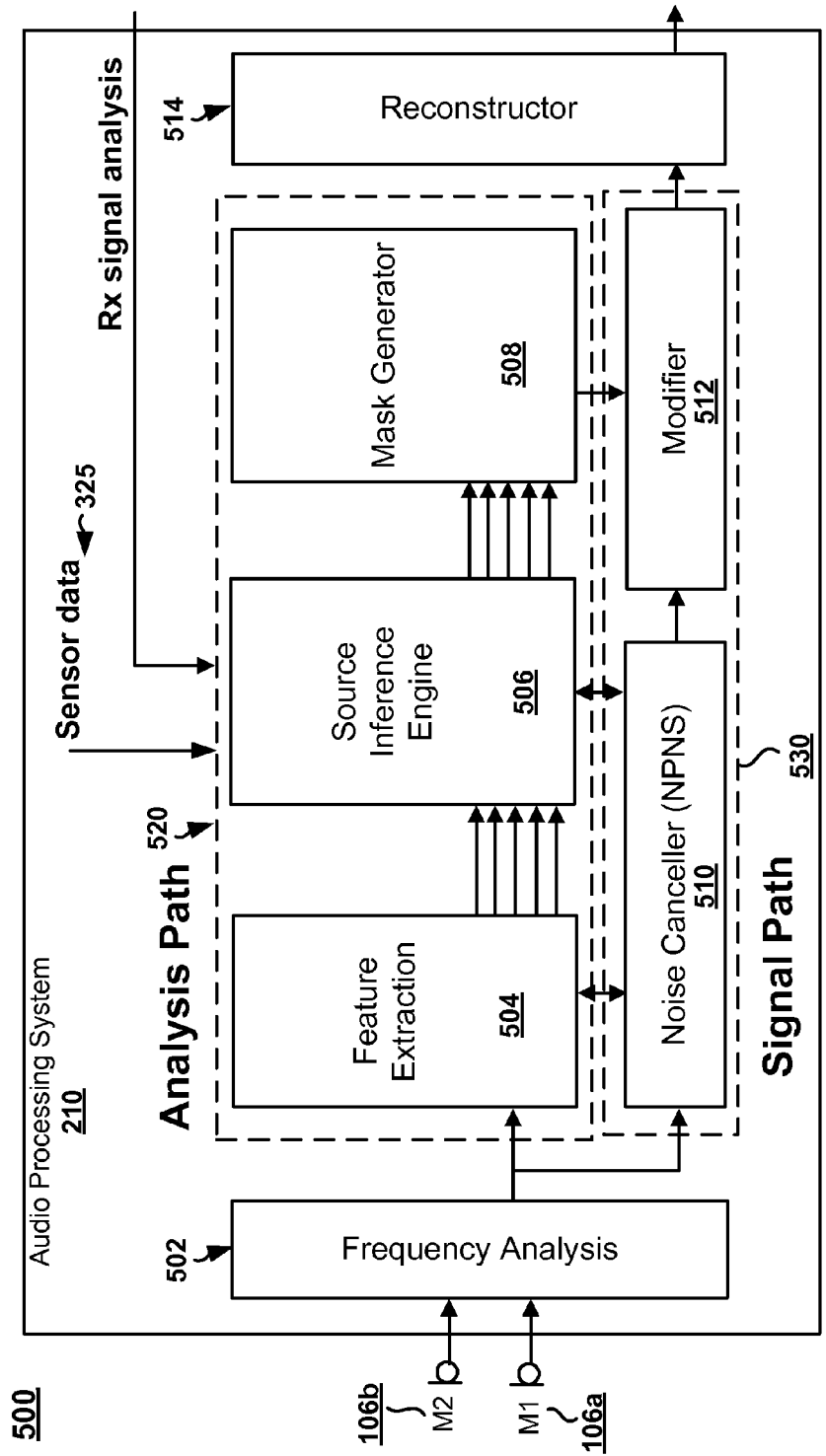
FIG. 5 is a block diagram of an example audio processing system.

FIG. 5 is a block diagram of an example audio processing system 210. In example embodiments, the audio processing system 210 (also shown in FIG. 2) may be embodied within a memory device inside the electronic device 104. The audio processing system 210 may include a frequency analysis module 502, a feature extraction module 504, a source inference engine module 506, a mask generator module 508, noise canceller (Null Processing Noise Subtraction or NPNS) module 510, modifier module 512, and reconstructor module 514. Descriptions of these modules are provided below.

The audio processing system 210 may include more or fewer components than illustrated in FIG. 5, and the functionality of modules may be combined or expanded into fewer or additional modules. Example lines of communication are illustrated between various modules of FIG. 5, and in other figures herein. The lines of communication are not intended to limit which modules are communicatively coupled with other modules, nor are they intended to limit the number of and type of signals between modules.

Data provided by non-acoustic sensor 120 (FIG. 2) may be used in audio processing system 210, for example, by analysis path sub-system 520. This is illustrated in FIG. 5 by sensor data 525, which may be provided by the non-acoustic sensor 120, leading into the analysis path sub-system 520.

In the audio processing system of FIG. 5, acoustic signals received from a primary microphone 106a and a secondary microphone 106b (in case there are two microphones 106 are used) may be converted to electrical signals, and the electrical signals may be processed by frequency analysis module 502. In one embodiment, the frequency analysis module 502 may receive the acoustic signals and mimics the frequency analysis of the cochlea (e.g., cochlear domain), simulated by a filter bank. The frequency analysis module 502 may separate each of the primary and secondary acoustic signals into two or more frequency sub-band signals. A sub-band signal is the result of a filtering operation on an input signal, where the bandwidth of the filter is narrower than the bandwidth of the signal received by the frequency analysis module 502. Alternatively, other filters such as a short-time Fourier transform (STFT), sub-band filter banks, modulated complex lapped transforms, cochlear models, wavelets, and so forth can be used for the frequency analysis and synthesis.

Because most sounds (e.g. acoustic signals) are complex and include more than one frequency, a sub-band analysis of the acoustic signal may determine what individual frequencies are present in each sub-band of the complex acoustic signal during a frame (e.g. a predetermined period of time). For example, the duration of a frame may be 4 ms, 8 ms, or some other length of time. Some embodiments may not use frames at all. The frequency analysis module 502 may provide sub-band signals in a fast cochlea transform (FCT) domain as an output.

Frames of sub-band signals may be provided by frequency analysis module 502 to the analysis path sub-system 520 and to the signal path sub-system 530. The analysis path sub-system 320 may process a signal to identify signal features, distinguish between speech components and noise components of the sub-band signals, and generate a signal modifier. The signal path sub-system 530 may modify sub-band signals of the primary acoustic signal, e.g. by applying a modifier such as a multiplicative gain mask or a filter, or by using subtractive signal components as may be generated in analysis path sub-system 520. The modification may reduce undesired components (i.e. noise) and preserve desired speech components (i.e. main speech) in the sub-band signals.

Noise suppression can use gain masks multiplied against a sub-band acoustic signal to suppress the energy levels of noise (i.e. undesired) components in the subband signals. This process may also be referred to as multiplicative noise suppression. In some embodiments, acoustic signals can be modified by other techniques, such as a filter. The energy level of a noise component may be reduced to less than a residual noise target level, which may be fixed or slowly vary over time. A residual noise target level may, for example, be defined as a level at which a noise component is no longer audible or perceptible, below a noise level of a microphone used to capture the acoustic signal, or below a noise gate of a component such as an internal Automatic Gain Control (AGC) noise gate or baseband noise gate within a system used to perform the noise cancellation techniques described herein.

Still referring to FIG. 5, the signal path sub-system 530 within audio processing system 210 may include NPNS module 510 and modifier module 512. The NPNS module 510 may receive sub-band frame signals from frequency analysis module 502. The NPNS module 510 may subtract (e.g., cancel) an undesired component (i.e. noise) from one or more sub-band signals of the primary acoustic signal. As such, the NPNS module 510 may output sub-band estimates of noise components in the primary signal and sub-band estimates of speech components in the form of noise-subtracted sub-band signals.

The NPNS module 510 within signal path sub-system 530 may be implemented in a variety of ways. In some embodiments, the NPNS module 510 may be implemented with a single NPNS module. Alternatively, the NPNS module 510 may include two or more NPNS modules, which may be arranged for example in a cascade fashion. The NPNS module 510 can provide noise cancellation for two-microphone configurations, for example based on source location, by utilizing a subtractive algorithm. It can also provide echo cancellation. Since noise and echo cancellation can usually be achieved with little or no voice quality degradation, processing performed by the NPNS module 510 may result in an increased signal-to-noise-ratio (SNR) in the primary acoustic signal received by subsequent post-filtering and multiplicative stages, some of which are shown elsewhere in FIG. 5. The amount of noise cancellation performed may depend on the diffuseness of the noise source and the distance between microphones. These both contribute towards the coherence of the noise between the microphones, with greater coherence resulting in better cancellation by the NPNS module.

An example of null processing noise subtraction performed in some embodiments by the NPNS module 510 is disclosed in U.S. Utility patent application Ser. No. 12/422,917, entitled "Adaptive Noise Cancellation," filed Apr. 13, 2009, which is incorporated herein by reference.

Noise cancellation may be based on null processing, which involves cancelling an undesired component in an acoustic signal by attenuating audio from a specific direction, while simultaneously preserving a desired component in an acoustic signal, e.g. from a target location such as a main talker. The desired audio signal may include a speech signal. Null processing noise cancellation systems can determine a vector that indicates the direction of the source of an undesired component in an acoustic signal. This vector is referred to as a spatial "null" or "null vector." Audio from the direction of the spatial null may be subsequently reduced. As the source of an undesired component in an acoustic signal moves relative to the position of the microphone(s), a noise reduction system can track the movement, and adapt and/or update the corresponding spatial null accordingly.

An example of a multi-microphone noise cancellation system which may perform null processing noise subtraction (NPNS) is described in U.S. Utility patent application Ser. No. 12/215,980, entitled "System and Method for Providing Noise Suppression Utilizing Null Processing Noise Subtraction," filed Jun. 30, 2008, which is incorporated herein by reference. Noise subtraction systems can operate effectively in dynamic conditions and/or environments by continually interpreting the conditions and/or environment and adapting accordingly.

Information from the non-acoustic sensor 120 may be used to control the direction of a spatial null in the noise canceller 510. In particular, the non-acoustic sensor information may be used to direct a null in an NPNS module or a synthetic cardioid system based on positional information provided by the non-acoustic sensor 120. An example of a synthetic cardioid system is described in U.S. Utility patent application Ser. No. 11/699,732, entitled "System and Method for Utilizing Omni-Directional Microphones for Speech Enhancement," filed Jan. 29, 2007, which is incorporated herein by reference.

In a two-microphone system, coefficients $\sigma$ and $\alpha$ may have complex values. The coefficients may represent the transfer functions from a primary microphone signal (P) to a secondary (S) microphone signal in a two-microphone representation. However, the coefficients may also be used in an N microphone system. The goal of the $\sigma$ coefficient(s) is to cancel the speech signal component captured by the primary microphone from the secondary microphone signal. The cancellation can be represented as S-$\sigma$P. The output of this subtraction is an estimate of the noise in the acoustic environment. The $\alpha$ coefficient is used to cancel the noise from the primary microphone signal using this noise estimate. The ideal $\sigma$ and $\alpha$ coefficients can be derived using adaptation rules, wherein adaptation may be necessary to point the $\sigma$ null in the direction of the speech source and the $\alpha$ null in the direction of the noise.

In adverse SNR conditions, it may become difficult to keep the system working optimally, i.e. optimally cancelling the noise and preserving the speech. In general, since speech cancellation is the most undesirable behavior, the system may be tuned in order to minimize speech loss. Even with the conservative tuning, noise leakage may occur.

As an alternative, a spatial map of the $\sigma$ (and potentially $\alpha$) coefficients can be created in the form of a table, comprising one set of coefficients per valid position. Each combination of coefficients may represent a position of the microphone(s) of the communication device relative to the MRP and/or a noise source. From the full set entailing all valid positions, an optimal set of values can be created, for example using the LBG algorithm. The size of the table may vary depending on the computation and memory resources available in the system. For example, the table could contain u and a coefficients describing all possible positions of the phone around the head. The table could then be indexed using three-dimensional and proximity sensor data.

Still referring to FIG. 5, the analysis path sub-system 520 may include the feature extraction module 504, source interference engine module 506, and mask generator module 508. The feature extraction module 504 may receive the sub-band frame signals derived from the primary and secondary acoustic signals provided by frequency analysis module 502. Furthermore, feature extraction module 504 may receive the output of NPNS module 510. The feature extraction module 504 may compute frame energy estimations of the sub-band signals, an inter-microphone level difference (ILD) between the primary acoustic signal and the secondary acoustic signal, and self-noise estimates for the primary and second microphones. The feature extraction module 504 may also compute other monaural or binaural features for processing by other modules, such as pitch estimates and cross-correlations between microphone signals. Further, the feature extraction module 504 may provide inputs to and process outputs from the NPNS module 510, as indicated by a double-headed arrow in FIG. 5.

The feature extraction module 504 may compute energy levels for the sub-band signals of the primary and secondary acoustic signal and an inter-microphone level difference (ILD) from the energy levels. The ILD may be determined by feature extraction module 504. Determining energy level estimates and inter-microphone level differences is discussed in more detail in U.S. Utility patent application Ser. No. 11/343, 524, entitled "System and Method for Utilizing Inter-Microphone Level Differences for Speech Enhancement", which is incorporated herein by reference.

Non-acoustic sensor information may be used to configure a gain of a microphone signal as processed, for example by the feature extraction module 504. Specifically, in multi-microphone systems that use ILD as a source discrimination cue, the level of the main speech decreases as the distance from the primary microphone to the MRP increases. If the distance from all microphones to the MRP increases, the ILD of the main speech decreases, resulting in less discrimination between the main speech and the noise sources. Such corruption of the ILD cue may typically lead to undesirable speech loss. Increasing the gain of the primary microphone modifies the ILD in favor of the primary microphone. This results in less noise suppression, but improves positional robustness.

Another part of analysis path sub-system 520 is source inference engine module 506, which may process frame energy estimates to compute noise estimates, and which may derive models of the noise and speech from the sub-band signals. The frame energy estimate processed in module 506 may include the energy estimates of the output of the frequency analysis 502 and of the noise canceller 510. The source inference engine module 506 may adaptively estimate attributes of the acoustic sources. The energy estimates may be used in conjunction with speech models, noise models, and other attributes, estimated in module 506, to generate a multiplicative mask in mask generator module 508.

Still referring to FIG. 5, the source inference engine module 506 may receive the ILD from feature extraction module 504 and track the ILD-probability distributions or "clusters" of sound source 102, noise 108, and, optionally, echo. When the source and noise ILD-probability distributions are non-overlapping, it is possible to specify a classification boundary or dominance threshold between the two distributions. The classification boundary or dominance threshold may be used to classify an audio signal as speech if the ILD is sufficiently positive or as noise if the ILD is sufficiently negative. The classification may be determined per sub-band and time frame and used to form a dominance mask as part of a cluster tracking process.

The classification may additionally be based on features extracted from one or more non-acoustic sensors 120, and as a result, the audio processing system may exhibit improved positional robustness. The source interference engine module 506 may perform an analysis of sensor data 525, depending on which system parameters are intended to be modified based on the non-acoustic sensor data.

The source interference engine module 506 may provide the generated classification to the NPNS module 510, and may utilize the classification to estimate noise in NPNS output signals. A current noise estimate along with locations in the energy spectrum are provided for processing a noise signal within the audio processing system 210. Tracking clusters are described in U.S. Utility patent application Ser. No. 12/004,897, entitled "System and Method for Adaptive Classification of Audio Sources," filed on Dec. 21, 2007, the disclosure of which is incorporated herein by reference.

The source inference engine module 506 may generate an ILD noise estimate and a stationary noise estimate. In one embodiment, the noise estimates can be combined with a max( ) operation, so that the noise suppression performance resulting from the combined noise estimate is at least that of the individual noise estimates. The ILD noise estimate can be derived from the dominance mask and the output of NPNS module 510.

For a given normalized ILD, sub-band, and non-acoustical sensor information, a corresponding equalization function may be applied to the normalized ILD signal to correct distortion. The equalization function may be applied to the normalized ILD signal by either the source inference engine 506 or mask generator 508.

The mask generator module 508 of the analysis path sub-system 520 may receive models of the sub-band speech components and/or noise components as estimated by the source inference engine module 506. Noise estimates of the noise spectrum for each sub-band signal may be subtracted out of the energy estimate of the primary spectrum to infer a speech spectrum. The mask generator module 508 may determine a gain mask for the sub-band signals of the primary acoustic signal and provide the gain mask to the modifier module 512. The modifier module 512 multiplies the gain masks and the noise-subtracted sub-band signals of the primary acoustic signal output by the NPNS module 510, as indicated by the arrow from NPNS module 510 to the modifier module 512. Applying the mask reduces the energy levels of noise components in the sub-band signals of the primary acoustic signal and thus accomplishes noise reduction.

Values of the gain mask output from mask generator module 308 may be time-dependent and sub-band-signal-dependent, and may optimize noise reduction on a per sub-band basis. Noise reduction may be subject to the constraint that the speech loss distortion complies with a tolerable threshold limit. The threshold limit may be based on many factors. Noise reduction may be less than substantial when certain conditions, such as unacceptably high speech loss distortion, do not allow for more noise reduction. In various embodiments, the energy level of the noise component in the sub-band signal may be reduced to less than a residual noise target level. In some embodiments, the residual noise target level is substantially the same for each sub-band signal.

The reconstructor module 514 may convert the masked frequency sub-band signals from the cochlea domain back into the time domain. The conversion may include applying gains and phase shifts to the masked frequency sub-band signals adding the resulting signals. Once conversion to the time domain is completed, the synthesized acoustic signal may be provided to the user via the output device 206 and/or provided to a codec for encoding.

In some embodiments, additional post-processing of the synthesized time domain acoustic signal may be performed. For example, comfort noise generated by a comfort noise generator may be added to the synthesized acoustic signal prior to providing the signal to the user. Comfort noise may be a uniform constant noise that is not usually discernible by a listener (e.g., pink noise). This comfort noise may be added to the synthesized acoustic signal to enforce a threshold of audibility and to mask low-level non-stationary output noise components. In some embodiments, the comfort noise level may be chosen to be just above a threshold of audibility and/or may be settable by a user.

In some embodiments, noise may be reduced in acoustic signals received by the audio processing system 210 by a system that adapts over time. Audio processing system 210 may perform noise suppression and noise cancellation using initial values of parameters, which may be adapted over time based on information received from the non-acoustic sensor 120, acoustic signal processing, and a combination of non-acoustic sensor 120 information and acoustic signal processing.

Figure 6:
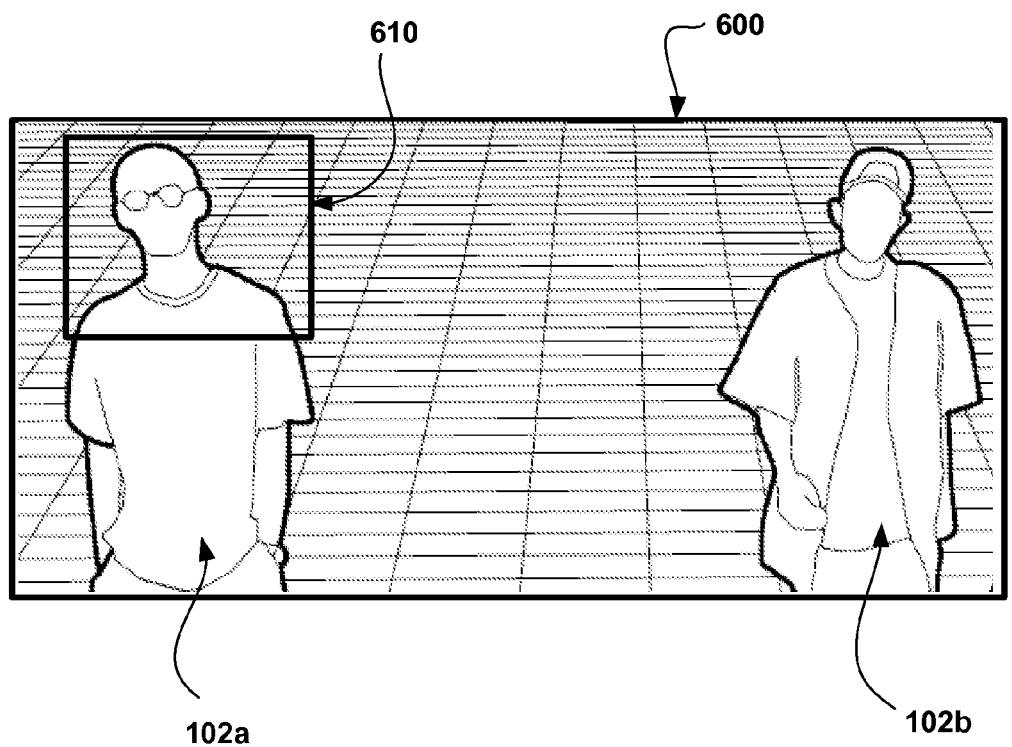
FIG. 6 shows an example graphical user interface of an electronic device.

FIG. 6 shows an example GUI 600 as displayed on a display screen of the electronic device 104. As discussed above with reference to FIG. 2, the video signal captured by the video camera 130 may be displayed onto a display screen for watching by a user in real time. In the example shown in FIG. 6 there are two sound sources 102*a* and 102*b*, which refer to users and talkers correspondingly. By processing the video signal, the electronic device 104 may determine which one of the sound sources 102*a* and 102*b* is currently producing sound. For example, upon determining that the talker 102*a* is currently speaking, a corresponding indication 610 may be overlaid over the current video image. The indication 610 may be dynamically replaced according to motions of the sound source 102*a*.

According to various embodiments of the present disclosure, the user of the electronic device 104 may select one or more of the sound sources 102 for tracking. In an example, the user may select (e.g., by clicking onto a touchscreen) the sound source 102*a*, and, in response, the electronic device will track motion of the sound source 102*a*, applying a dynamic beam-steering algorithm, and performing noise suppression or cancellation. In certain embodiments, the electronic device may reduce energy levels of those acoustic signal components captured by the microphone(s) 106 that have no association with the selected sound source 102*a*. Thus, the user may hear or record the clearer acoustic signal of the talker speech.

Figure 7:
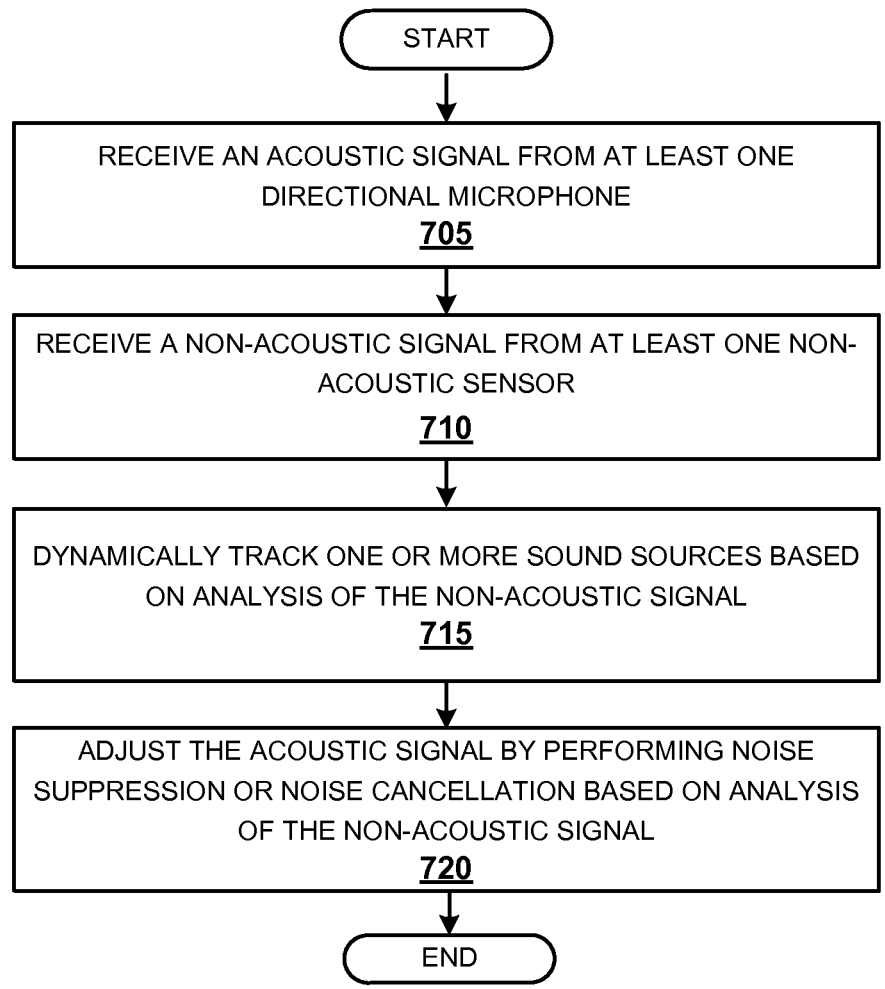
FIG. 7 illustrates a flow chart of an example method for audio processing.

FIG. 7 illustrates a flow chart of an example method 700 for audio processing. The method 700 may be practiced by the electronic device 104 and its components as described above with references to FIGS. 1-5.

The method 700 may commence in operation 705 when an acoustic signal is received from one or more microphones 106, which acoustic signal may then be provided to the audio processing system 210. In operation 710, a non-acoustic sensor information may be received from the non-acoustic sensor 120 or video camera 130. The non-acoustic sensor information may include relative positional information or special information of an environment having one or more sound sources 102 and, optionally, noise sources. The non-acoustic sensor information may be utilized by the processor 202 to process the acoustic signal or its components. In particular, in optional operation 715, the processor 202 may dynamically track the one or more sound sources based on the analysis of the non-acoustic sensor information. Specifically, the processor 202 may control beam steering to dynamically track a specific sound source 102 (e.g., a talker) regardless of its position within the environment. Further, in optional operation 720, the processor 202 may dynamically adjust the acoustic signal based on the non-acoustic sensor information (e.g., by tuning a beamformer). In particular, the processor 202 may perform noise suppression or adjustment of energy levels of specific acoustic signal components based on predetermined settings.

Figure 8:
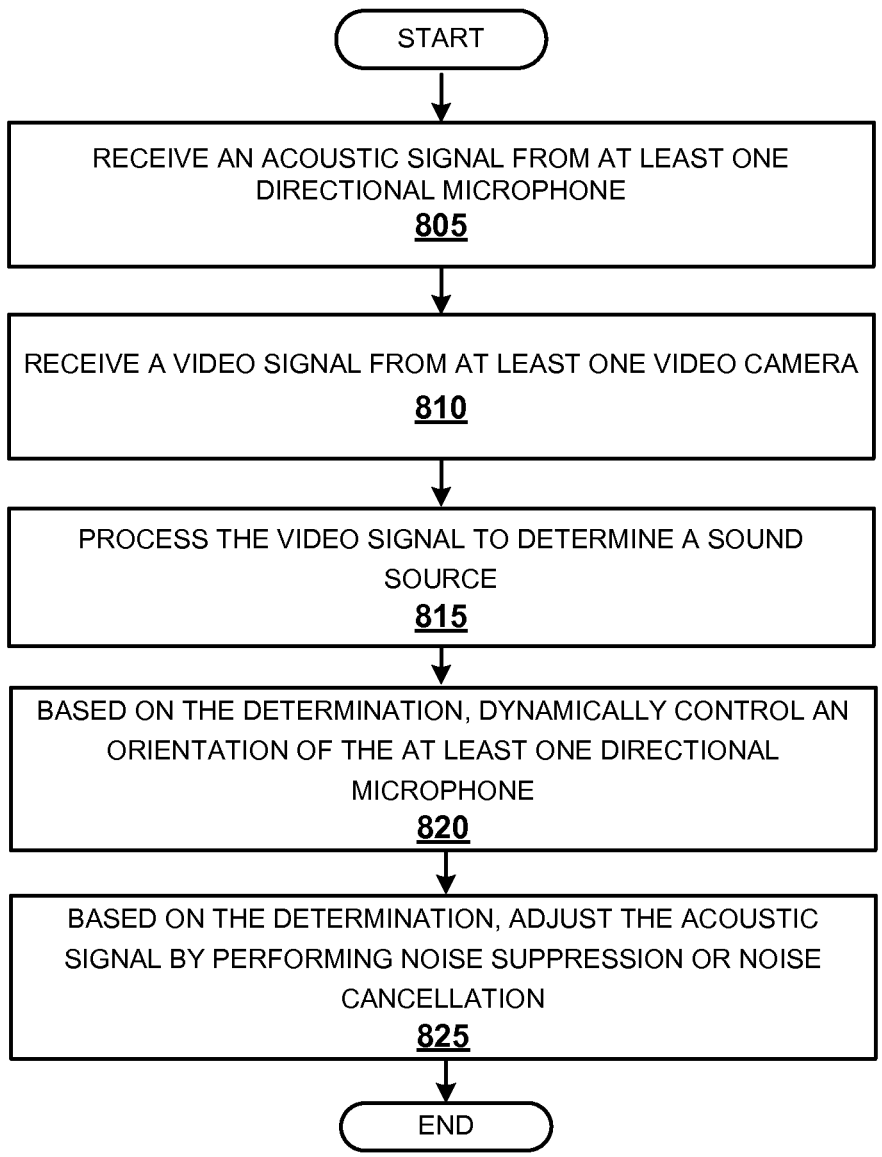
FIG. 8 illustrates a flow chart of another example method for audio processing.

FIG. 8 illustrates a flow chart of another example method 800 for audio processing. The method 800 may be practiced by the electronic device 104 and associated components as described above with references to FIGS. 1-5.

The method 800 may commence in operation 805 when an acoustic signal is received from one or more microphones 106, which acoustic signal may then be provided to the audio processing system 210 for processing. In operation 810, a video signal may be received from one or more video cameras 130. In operation 815, the video signal may be processed by the processor 202 to determine the presence, location, or relative location of one or more sound sources 102 such as talkers. The processor 202 may also determine positional information of the one or more sound sources 102. As discussed above, to locate the sound source 102 and its parameters, the processor 202 may perform face recognition technique.

Further, in operation 820, the processor 202 may apply an acoustic beam steering algorithm to dynamically track the sound source, based on the positional information derived from the video signal. Specifically, the processor 202 may control the orientation of the one or more microphones 106 so that they are constantly directed towards a specific sound source 102 (e.g., a talker selected by a user) regardless of its position within the environment. Furthermore, in operation 825, the processor 202 may dynamically adjust the acoustic signal acquired by the one or more microphones 106 based on the positional information. In particular, the processor 202 may perform noise suppression or adjustment of energy levels of specific acoustic signal components based on predetermined settings.

Figure 9:
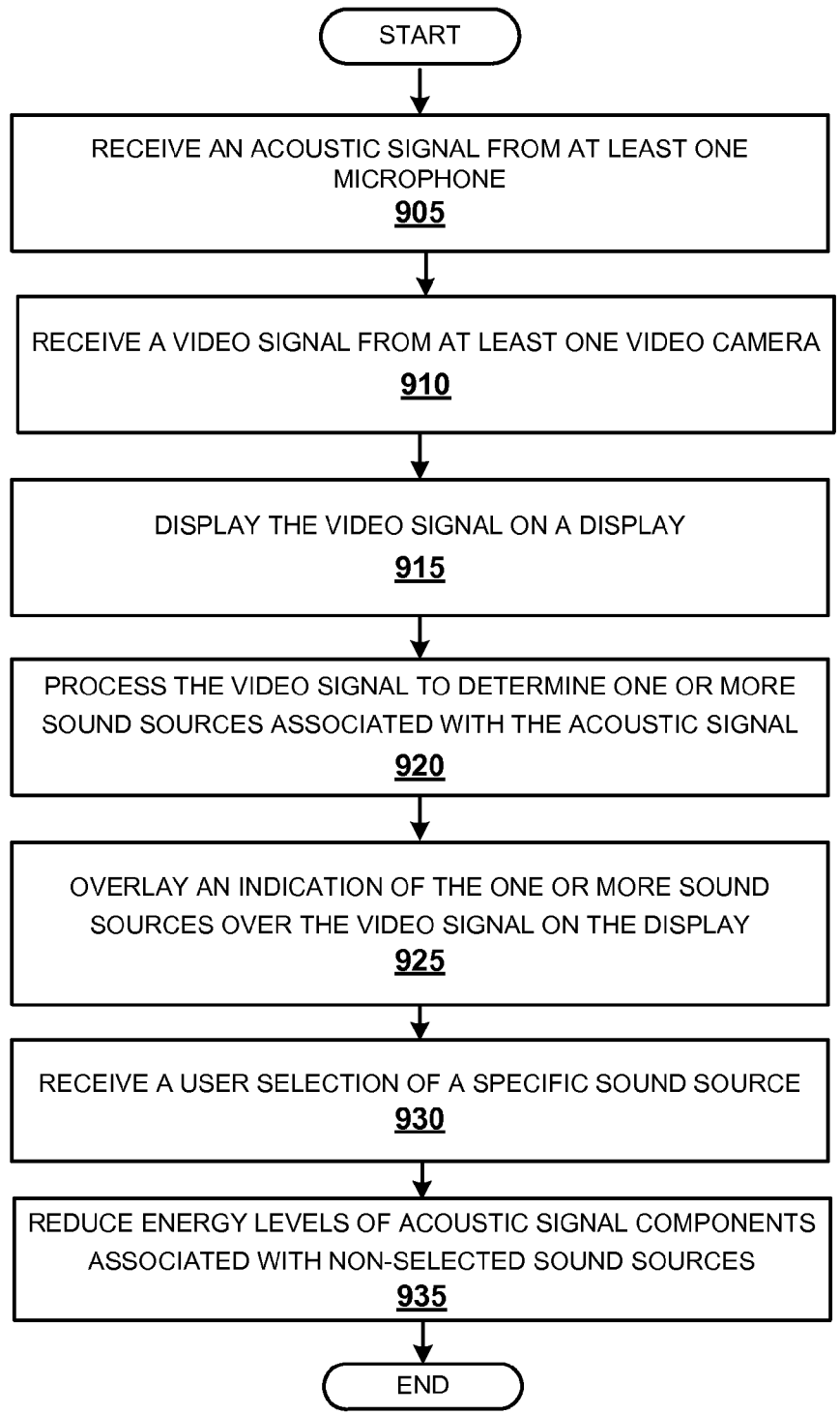
FIG. 9 illustrates a flow chart of an example method for audio and video processing.

FIG. 9 illustrates a flow chart of an example method 900 for audio and video processing. The method 900 may be practiced by the electronic device 104 and its components as described above with references to FIGS. 1-5.

The method 900 may commence in operation 905 when an acoustic signal is received from at least one microphone 106. In operation 910, a video signal may be received from at least one video camera 130. In operation 915, the video signal may be displayed on a display screen of the electronic device 104 as shown, for example, in FIG. 6. In operation 920, the video signal may be processed by the processor 202 to determine the presence, location, or relative location of one or more sound sources 102, such as talkers, within the environment, which the acoustic signal is originated from. The processor 202 may also determine positional information of the one or more sound sources 102 as discussed above. In operation 925, one or more indications of the one or more determined sound sources 102 can be displayed over the video signal onto the display screen of the electronic device 104 (as shown in FIG. 6).

Further, in optional operation 930, a user selection of a specific sound source 102 may be received by the processor 202. In response to the user selection, in optional operation 935, the processor 202 may dynamically adjust the energy levels of specific acoustic signal components unrelated to the selected sound source 102.

The present technology is described above with reference to example embodiments. It will be apparent to those skilled in the art that various modifications may be made and other embodiments can be used without departing from the broader scope of the present technology. For example, embodiments of the present invention may be applied to any system (e.g., non-speech enhancement system) utilizing acoustic echo cancellation (AEC). Therefore, these and other variations upon the example embodiments are intended to be covered by the present invention.

What is claimed is:

1. A computer implement method for audio processing, the method comprising:

processing a video signal, by at least one processor, to determine a sound source, the video signal representing at least one captured image and not including audio;

receiving distance information associated with a distance between the sound source and at least one microphone;

based on the determination, selectively processing, using the at least one processor, an acoustic signal, the acoustic signal representing at least one sound captured using at least one microphone, the selective processing comprising:

determining, based on the processing of the video signal, that the acoustic signal does not include any speech of a main talker, such that the acoustic signal is a noise signal; and performing noise suppression of the acoustic signal based on the determination that the acoustic signal is a noise signal that does not include any speech of the main talker, the noise suppression comprising adaptively modifying the acoustic signal based on the distance information, the noise suppression being performed using the at least one processor.

2. The method of claim 1, wherein the acoustic signal is captured using at least one microphone.

3. The method of claim 2, wherein the selective processing of the acoustic signal further comprises:

determining that the acoustic signal includes speech of the main talker based on the processing of the video signal; and based on the determination that the acoustic signal includes the speech of the main talker, steering, based on a beam steering algorithm, the at least one microphone towards a direction of the sound source to adjust a gain of the acoustic signal.

4. The method of claim 1, further comprising performing noise suppression of the acoustic signal based on the determination of the sound source.

5. The method of claim 1, wherein the processing of the video signal includes detection of a noise-producing object associated with the sound source based on movement of all or a portion of the noise-producing object.

6. The method of claim 5, wherein the processing of the video signal includes recognition of lips associated with the main talker.

7. The method of claim 1, wherein the video signal represents at least one infrared image, and wherein the processing of the video signal includes analyzing thermal levels associated with the at least one infrared image to determine the sound source.

8. The method of claim 1, wherein the distance information is received from one or more of an autofocus optical system, a light sensor, and a proximity sensor.

9. The method of claim 1, further comprising receiving an indication of a spatial area associated with the sound source.

10. The method of claim 9, further comprising modifying acoustic signal components associated with one or more sound sources located outside of the spatial area.

11. The method of claim 1, further comprising dynamically selecting one or more microphones substantially directed towards the sound source for capturing the acoustic signal.

12. The method of claim 1, further comprising tracking a location associated with the sound source in real time.

13. The method of claim 1, further comprising dynamically adjusting, in real time, the orientation of at least one microphone so that the at least one microphone is constantly directed towards the sound source.

14. A computer implemented method for audio processing, the method comprising:

processing a video signal, by at least one processor, to determine a sound source within an environment, wherein the video signal represents at least one captured image and does not include audio, and wherein the sound source is associated with an acoustic signal representing at least one sound captured using at least one microphone;

receiving distance information associated with a distance between the sound source and the at least one microphone;

based on the determination, adaptively suppressing, using the at least one processor, noise in the acoustic signal, the adaptive noise suppression comprising:

determining, based on the processing of the video signal, that the acoustic signal does not include any speech of a main talker, such that the acoustic signal is a noise signal; and performing noise suppression of the acoustic signal based on the determination that the acoustic signal is a noise signal that does not include any speech of the main talker, the noise suppression comprising adaptively modifying the acoustic signal based on the distance information, the noise suppression being performed using the at least one processor.

15. The method of claim 14, further comprising processing the video signal to determine that the sound source originated with the main talker and determine movement of lips associated with the main talker.

16. The method of claim 15, wherein a level of the noise suppression is associated with the movement of the lips.

17. The method of claim 15, further comprising estimating one or more levels of noise based on the movement of the lips, wherein the noise suppression is based on the estimated one or more levels of noise.

18. The method of claim 15, further comprising determining at least one phoneme based on the video signal and the acoustic signal, and wherein the adaptively suppressing noise in the acoustic signal is further based on the determination of the at least one phoneme.

19. A computer implemented method for audio and video processing, the method comprising:

processing, using at least one hardware processor, a video signal to determine one or more sound sources, the video signal not including audio;

determining, based on the processing of the video signal, that an acoustic signal captured using at least one microphone does not include any speech of a main talker, such that the acoustic signal is a noise signal;

receiving distance information associated with a distance between the sound source and the at least one microphone; and performing noise suppression of the acoustic signal based on the determination that the acoustic signal is a noise signal that does not include any speech of the main talker, the noise suppression comprising adaptively modifying the acoustic signal based on the distance information, the noise suppression being performed using the at least one hardware processor.

20. The method of claim 19, further comprising receiving a selection of one or more of the one or more sound sources from a user.

21. The method of claim 20, further comprising reducing energy levels of acoustic signal components associated with non-selected sound sources.

22. The method of claim 20, further comprising displaying, on a display screen, an indication of the selected sound source.

23. The method of claim 20, further comprising performing noise suppression of acoustic signal components associated with the selected sound source.

24. The method of claim 20, further comprising dynamically steering an acoustic beam towards the selected sound source.

25. The method of claim 1, wherein the processing of the video signal includes detection of a noise-producing object associated with the sound source based on sensor information.

26. The method of claim 1, wherein the processing of the video signal includes face recognition of at least one talker.

27. The method of claim 1, wherein the processing of the video signal includes recognition of lips associated with the main talker.

* * * * *